United States Patent
Yau

(10) Patent No.: US 9,135,425 B2
(45) Date of Patent: Sep. 15, 2015

(54) METHOD AND SYSTEM OF PROVIDING AUTHENTICATION OF USER ACCESS TO A COMPUTER RESOURCE ON A MOBILE DEVICE

(71) Applicant: Arnold Yau, London (GB)

(72) Inventor: Arnold Yau, London (GB)

( * ) Notice: Subject to any disclaimer, the term of this patent is extended or adjusted under 35 U.S.C. 154(b) by 0 days.

(21) Appl. No.: 13/706,307

(22) Filed: Dec. 5, 2012

(65) Prior Publication Data

US 2014/0149746 A1    May 29, 2014

(30) Foreign Application Priority Data

Nov. 28, 2012    (GB) .................................. 1221433.4

(51) Int. Cl.
| | |
|---|---|
| *G06F 21/35* | (2013.01) |
| *H04W 12/06* | (2009.01) |
| *H04L 9/32* | (2006.01) |
| *H04L 29/06* | (2006.01) |
| *H04W 12/08* | (2009.01) |

(52) U.S. Cl.
CPC .............. *G06F 21/35* (2013.01); *H04L 9/3215* (2013.01); *H04W 12/06* (2013.01); *H04L 63/0853* (2013.01); *H04L 2463/082* (2013.01); *H04W 12/08* (2013.01)

(58) Field of Classification Search
CPC ........... H04L 29/06; H04L 9/00; G06F 15/16; G07F 7/1008
USPC .............................................. 726/20; 713/185
See application file for complete search history.

(56) References Cited

U.S. PATENT DOCUMENTS

| | | | |
|---|---|---|---|
| 8,539,233 | B2 | 9/2013 | Dubhashi et al. |
| 2003/0028653 | A1* | 2/2003 | New et al. ...................... 709/229 |
| 2005/0044398 | A1 | 2/2005 | Ballinger et al. |
| 2008/0209225 | A1* | 8/2008 | Lord et al. ..................... 713/185 |
| 2008/0289030 | A1 | 11/2008 | Poplett |

(Continued)

FOREIGN PATENT DOCUMENTS

| | | |
|---|---|---|
| GB | 2 476 989 A | 7/2011 |
| WO | WO 2012/103584 A1 | 8/2012 |

OTHER PUBLICATIONS

A. Nicholson, "Mobile Device Security Using Transient Authentication", IEEE Trans. On Mobile Computing 5:11 (Nov. 2006) at 1489, 14 pages, published in US.

(Continued)

*Primary Examiner* — Teshome Hailu
*Assistant Examiner* — Thanh Le
(74) *Attorney, Agent, or Firm* — Hickman Palermo Becker Bingham LLP

(57) ABSTRACT

A method and system of authenticating a computer resource such as an application or data on a mobile device uses a contactless token to provide user authentication. User credentials are stored on the token in the form of private keys, and encrypted data and passwords are stored on the device. When application user requires access to the resource an encrypted password is transmitted to and decrypted on the token using a stored private key. An unencrypted data encryption key or password is then transmitted back to the device under the protection of a cryptographic session key which is generated as a result of strong mutual authentication between the device and the token.

38 Claims, 12 Drawing Sheets

(56) References Cited

U.S. PATENT DOCUMENTS

| | | |
|---|---|---|
| 2009/0092253 A1 | 4/2009 | Asipov et al. |
| 2010/0211507 A1* | 8/2010 | Aabye et al. ............... 705/71 |
| 2010/0241867 A1* | 9/2010 | Brown et al. .............. 713/185 |
| 2011/0117966 A1* | 5/2011 | Coppinger ................. 455/558 |
| 2011/0142234 A1 | 6/2011 | Rogers |
| 2011/0320802 A1 | 12/2011 | Wang et al. |
| 2012/0117636 A1* | 5/2012 | Adams ........................ 726/9 |
| 2012/0272307 A1* | 10/2012 | Buer ........................... 726/9 |
| 2013/0024424 A1 | 1/2013 | Prahlad et al. |
| 2013/0214902 A1* | 8/2013 | Pineau et al. ............ 340/5.61 |

OTHER PUBLICATIONS

U.S. Appl. No. 14/174,727, filed Feb. 6, 2014, Final Office Action, Sep. 18, 2014.

U.S. Appl. No. 14/174,727, filed Feb. 6, 2014, Office Action, Apr. 9, 2014.

Menezes et al., "Handbook of Applied Cryptography", dated 1998, CRC Press LLC, USA, 32 pages.

European Patent Office, "Search Report" in application No. PCT/GB2013/053138, dated Apr. 23, 2015, 12 pages.

\* cited by examiner

METHOD AND SYSTEM OF PROVIDING AUTHENTICATION OF USER ACCESS TO A COMPUTER RESOURCE ON A MOBILE DEVICE

FIELD OF THE DISCLOSURE

The present application relates to a method and system of authenticating a user to a computer resource on a mobile device using a portable security token, for example with a contactless smart card, bracelet or ring. A preferred embodiment relates to providing data protection and secure access to applications and stored data on a mobile device (such as a phone or tablet) using a near-field communication (NFC) hardware token.

BACKGROUND

1. Introduction

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Most mobile device security systems employ the use of a simple password or PIN to authenticate the user. Despite the ubiquity of password-based systems, it has many problems. An ideal password needs to be easily remembered by the user. However, in order for passwords to be secure, they should be long and hard to predict, contradictory to the former requirement. This is further exacerbated by the proliferation of passwords for the multitude of applications a user typically uses, for which security best practice recommends different passwords should be used.

In addition to application access, some mobile users wish to ensure a high level of security for data (including entire files and data contained within a file or a data structure) on their device, against a number of external threat scenarios. For example, a user may use an app on a tablet or other portable device that synchronizes files with their desktop PC via an online storage service (e.g. Dropbox, Box.com [trademarks]). Some of the downloaded files may contain confidential information such as business documents. The user wishes to safeguard himself against the possibility of a data breach in the event of theft of the device.

A practical way to achieve this today is to enable device encryption on the mobile operating system, which uses an encryption key derived from the device lock screen password. For maximum security, this password should be long and complex. However using a long and complex password as the password to unlock the lock screen is extremely inconvenient for the user. Because of this, most users are reluctant to use any password more complicated than a 4 digit code to unlock the lock screen. A skilled attacker will be able to decrypt any files stored on a stolen device with brute force attack methods. Moreover, the confidential data is decrypted whenever the device has been unlocked, even when the user is not using the data, which increases the risk of a data breach unnecessarily.

Another possible approach to data encryption is for the app to generate its own encryption key. The problem with this approach is that the key would either have to be protected by or derived from a password for security, or has to be stored within the app in plaintext form for usability. The former approach inherits the same password complexity issue as the device encryption method above, while the latter offers little security as the attacker who could compromise the plaintext data could just as easily read the plaintext key and decrypt the data.

In some existing systems an additional level of security has been provided by requiring that an NFC capable mobile phone be first authenticated to the mobile network prior to an application being executed. An NFC token then provides an asymmetric key to the phone which in turn authenticates to a third-party service by performing digital signature within the phone itself.

An example of such a system is shown in US-A-2011/0212707. This, however, displays a number of disadvantages. In particular changing of the application credential requires re-programming or replacement of the token; the number of user credentials secured by the system is limited by the (small) storage capacity of the token; and the loss of the token poses a direct risk of exposure of the user's credentials. In addition, applications running on the mobile device and the server are capable of making use of the described security system only if they have been specifically programmed to do so. The system described cannot be used with pre-existing applications.

Another approach to multi-factor identification is described in US-A-2008/0289030. Here, a contactless token is, upon validation, used to allow access to the authentication credentials secured on the mobile device itself.

This has a number of serious disadvantages, including the necessity of using secure storage on the device. This is normally not available to application developers as it is maintained and controlled by the manufacturer of the device (e.g. mobile phone) or the supplier of the underlying operating system or a mobile network operator. Also, making use solely of a token identifier as a means of validating the token is likely to be insecure. RFID tokens can typically be read by any compatible reader, and can easily be cloned.

Yet a further approach is described in WO-A-2011/089423. This describes a system where the presence of a contactless token is used to authorize execution of a secure function or application, and is aimed primarily at mobile wallet uses.

Again, the system described has a number of disadvantages, primarily that it uses a form of logical control that is relatively easy to circumvent.

More generally, in the enterprise environment there exists significant security risk from allowing users to connect mobile devices into the network due to increased likelihood of unauthorized data access (leading to loss of data confidentiality and/or integrity) resulting from:

Inadvertently disclosed passcodes such as PINS or alphanumeric codes, e.g. from shoulder surfing Easily guessed passcodes Lost or stolen devices that are inadequately protected Unsupervised use of devices by a third party The Hoverkey system aims to provide solutions for applications to counter these threats.

With the present invention, the user may store a master key of high cryptographic strength (128 bits or above presently) on the portable security token, and this key can be used to either directly protect an app's data encryption key or a long and complex password, from which a sufficiently long and secure encryption key can be derived. This allows the user to protect any data stored on the device with a very strong encryption key. If the device is stolen, it is then infeasible for any potential attacker to decrypt the encrypted data on it without the associated token.

DETAILED DESCRIPTION OF EXAMPLE EMBODIMENTS

2. Example Embodiments

Figure 1:
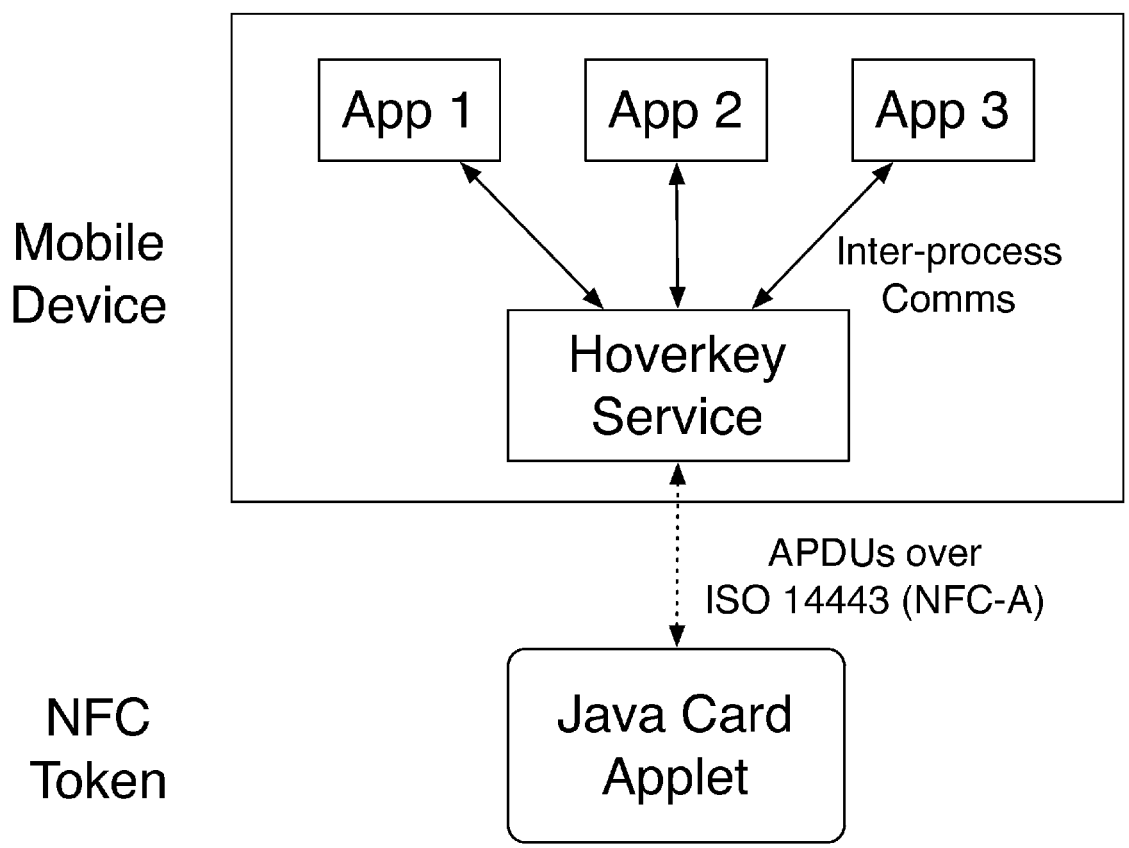
FIG. 1 shows the Hoverkey L1 high level architecture.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

2.1 The Invention and Preferable Features Thereof

According to the present invention there is provided a method and system of authenticating an application running on a mobile device as set out in the pre-characterising portions of the independent claims.

According to a first aspect of the present invention, a method of authenticating a computer resource on a mobile device comprises:

storing encrypted resource authorization on the device;

transmitting the encrypted authorization to a separate portable security token;

on the token, decrypting the encrypted authorization and generating at least partially therefrom an unlock response;

securely transmitting the unlock response to the mobile device; and unlocking the resource if the received unlock response is valid.

The unlock response may comprise a plain authorization, obtained by decrypting the decrypted authorization The unlock response may alternatively comprise a function (such as a hash) of a plain authorization, obtained by decrypting the decrypted authorization, and additional information.

Thus, in one usage mode, the token may verify and decrypt the encrypted authorization. Then, instead of returning a plain authorization to the device, protected by a session or other encryption key, the token may perform some computation on the plain authorization and possibly some other information (eg token-based information), and return the result to the device. Examples include the following:

EXAMPLE 1

Digital Signature: computation=digital signature function, plain authorization=private signing key; parameter=hash of message; output=digital signature on message hash

EXAMPLE 2

Key Derivation: computation=key derivation function; plain authorization=key derivation master secret; parameters=context information, output length; output=key derived from master secret

EXAMPLE 3

Re-encryption: computation=encryption function; plain authorization=encryption key; parameter=(another) encryption key; output=the plain authorization encrypted with a different key The authorization may comprise a password, PIN or cryptographic key.

The unlock response may be transmitted to the mobile device under the protection of an encryption key, such as a session key.

The token may store user./token ownership credentials, the decryption on the token being based on the user credentials.

The method may provide two-factor authentication by requiring a user in addition to authenticate separately on the mobile device, for example by the authentication on the mobile device being validated on the token before the unlock code is sent. Preferably, the method requires a proof of knowledge (e.g., a PIN) from the device (and ultimately from the user) before decrypting the authorization. The proof may be provided after mutual authentication. Alternatively, the device authentication may be entirely independent of the token authentication.

In one specific embodiment, the token operates in single-factor mode, which decrypts authorizations after mutual authentication with the device. Optionally, for extra security, it operates in 2-factor mode, in which a correct PIN must be provided by the device alongside the encrypted authorization, before the token will proceed with decryption.

A service may be run on the mobile device which controls device cryptographic functions and access to the resource. An applet may be run on the token which provides token cryptographic functions.

The user credentials may be generated by the token and never leave the token (or the app running on the token).

Preferably, the encrypted authorization stored on the mobile device can be decrypted solely with the corresponding user credentials stored on the token.

The method may include verifying integrity on the token by a message authentication code (MAC) received from the device.

The method may include verifying the integrity of the encrypted authorization on the token prior to decryption.

The device and the token may perform cryptographic mutual authentication before transmission of the encrypted authorization.

The encryption, decryption and/or the mutual authentication may be provided by symmetric key cryptography A user secret may be passed from the device to the token and may be validated by the token before the decryption operation takes place.

The resource may comprise data, or an application running or stored on the mobile device.

According to another aspect of the invention, a system of authenticating access to a computer resource on a mobile device with a portable security token comprises:
- a device including a computer resource to be protected, a device communications system, and device storage for storing encrypted resource authorization;
- a token including token storage for storing private user credentials, a token communications system, and a token processor providing cryptographic functions;
- and wherein in use the encrypted authorization stored on the device is transmitted by the device communications system to the token, is decrypted on the token using the user credentials, the token generating at least partially therefrom an unlock response, the unlock response being securely transmitted by the token communications system to the mobile device, and
- the device being arranged to unlock the resource if the received unlock response is valid.

The device communications system and the token communications system may communicate over the air, eg by Near Field Communication (NFC). Alternatively, the device communications system and the token communications system may communicate only when the token is in contact with the device via a physical interface.

The device communications system may send a user secret to the token which is validated by the token before the decryption operation takes place.

The device communications system may send a message authentication code (MAC) to the token, which is validated by the token before the decryption operation takes place.

According to a further aspect of the invention, a hardware token for authenticating a computer resource on a mobile device, the token comprises:
- token storage for the storage of a plurality of user credentials;
- a token communications system for communicating with a mobile device;
- a token processor providing cryptographic functions; and wherein, in use:
  - on receipt by the token communications system of an encrypted authorization, the token processor verifies the integrity and decrypts the encrypted authorization and generates at least partially therefrom an unlock response, and wherein the token communications system securely transmits the unlock response for use by a mobile device.

The preferred system of the present invention preferably comprises:
1. One or more mobile devices
2. An NFC token programmed to:
   a) Be able to mutually authenticated with any of the user's devices
   b) Respond only the commands issued by any of the user's devices
   c) Perform encryption and integrity protection of data provided by the device
   d) Return the cryptographically protected data
   e) Perform the decryption and integrity verification on previously protected data
   f) Optionally require validation of a user PIN prior to performing decryption operations
3. A password manager application installed each the mobile device
4. Any number of third-party applications secured by the system The mobile device may comprise any mobile or portable hardware device which is capable of running user applications and handling communication and cryptographic functions. Typical devices include mobile phones, tablets, laptop computers and the like. The token may be any portable or mobile hardware token which is capable of communication (preferably contactless communication) with a mobile device and which includes storage and an executable system which is capable of handling communications and cryptographic functions.

The protected computer resource may be held in a device memory or store or (where an application) may be held ready for execution or may be actually running in an execution environment. To that end, the device may include a store, a memory, and a processor.

Typically, the token will be a contactless smart card, although other tokens held by or carried on the person would be equally possible. Suitable tokens might include a ring to be worn on the user's finger, a device incorporated into a watch, belt, spectacles, clothing or anything else normally worn by the user, or even a device embedded under the user's skin.

The application authentication stored on the device may comprise an application password or PIN. The user credentials stored on the token may comprise a private cryptographic key.

It is preferred that communication between the token and the mobile device makes use of NFC, although other channels could equally well be used including Bluetooth or other types of radio frequency communication. Tokens requiring contact with the mobile device, including swipe cards and electrical contact cards are also envisaged.

2.2 Hoverkey Level 1

In the preferred embodiment the present invention is preferably embodied within a product called Hoverkey. Hoverkey's design is optimised for ease of integration with existing mobile apps and web apps, as well as ease of use. It implements a secure user credential (e.g. password) storage and retrieval system, secured using NFC tokens.

The present application is particularly concerned with an embodiment that uses a specific security design, referred to in this description as "level 1". References to Hoverkey level 1 (or Hoverkey L1) should be understood accordingly.

2.2.1 Security Concept

The concept behind Hoverkey L1 is designed to work with all existing applications which authenticate the user using a user name and password combination, although authentication methods other than passwords may be used. Typically, without any changes to the application to be accessed, the technology simply replaces manual entry of the user's password with a touch of an NFC token. This embodiment offers the following advantages:
- No changes required for the application server, which allows easy integration
- Changes to any existing application clients can be easily implemented through the use of a Hoverkey Component.
- Better security by letting technology to "remember" passwords for the user, which means
  - The user can choose passwords that are more secure (longer and more "random")
  - The user can choose different password for different accounts without the fear or inconvenience of forgotten passwords
- Eliminates the need for entering alphanumeric passwords on an onscreen keyboard, especially when symbols are included, which is slow and error-prone and subject to shoulder-surfing attacks.

3. Overview

Figure 2:
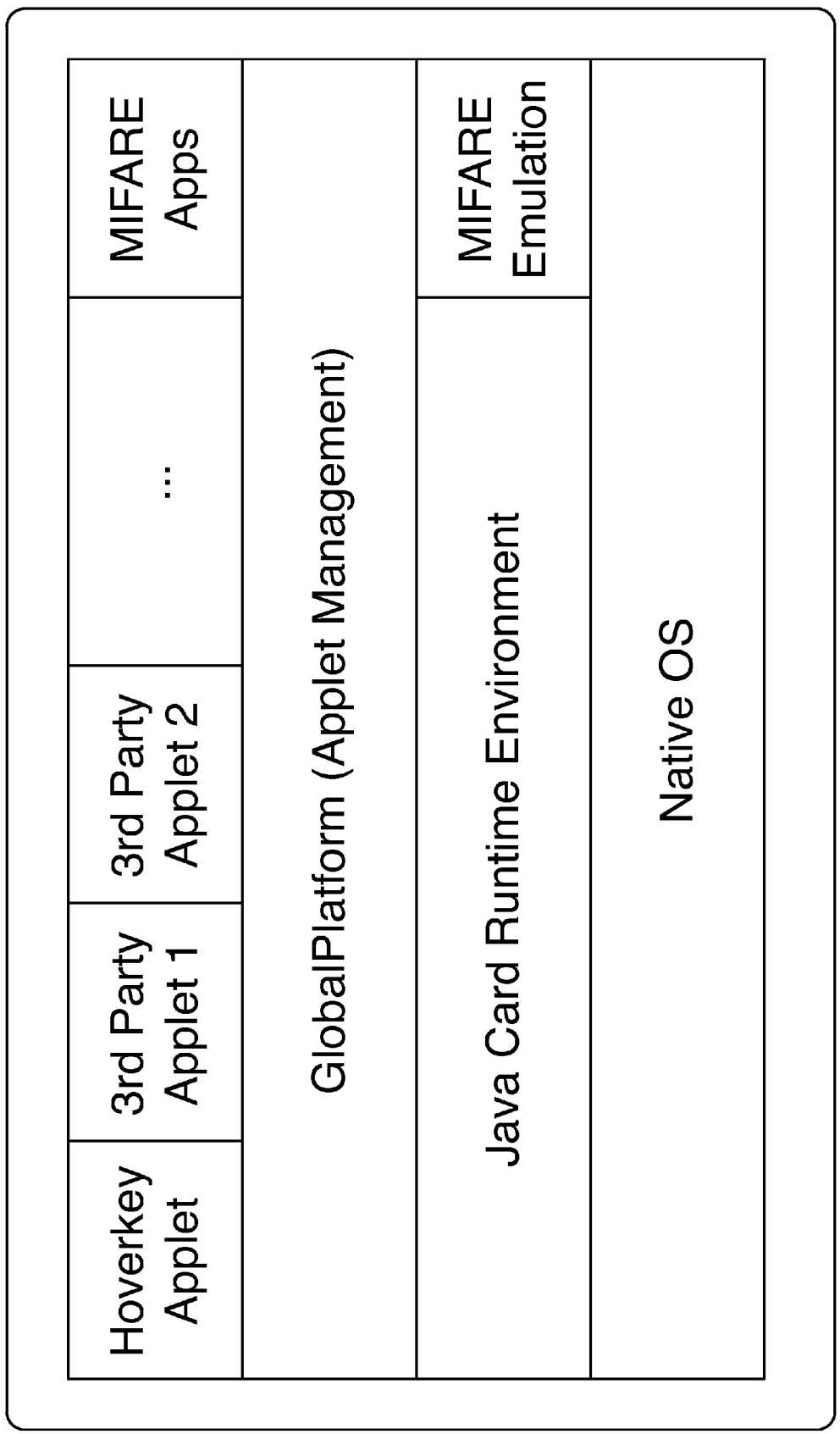
FIG. 2 shows the organization of the Java card and the applets
Figure 3:
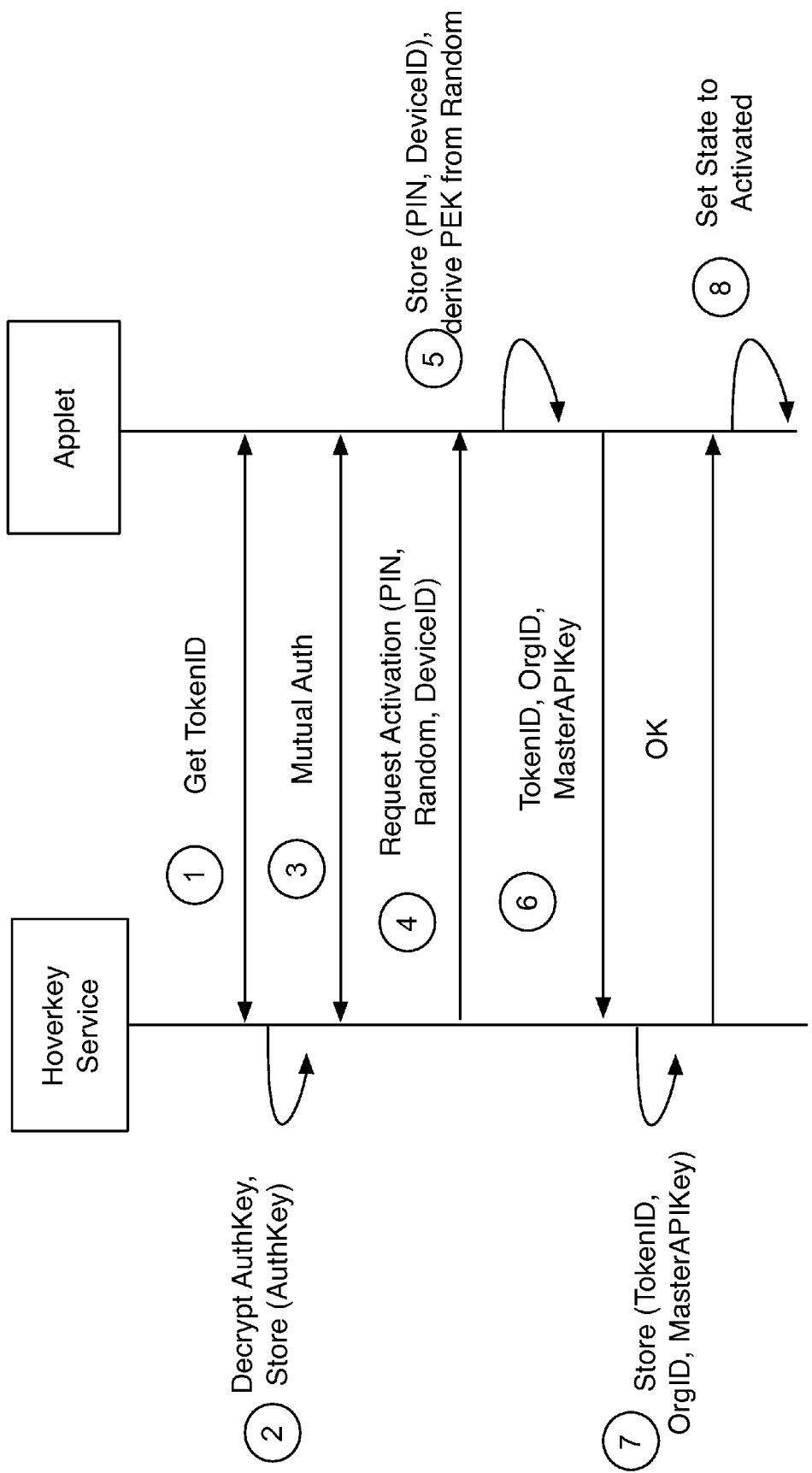
FIG. 3 shows the activation protocol.
Figure 4:
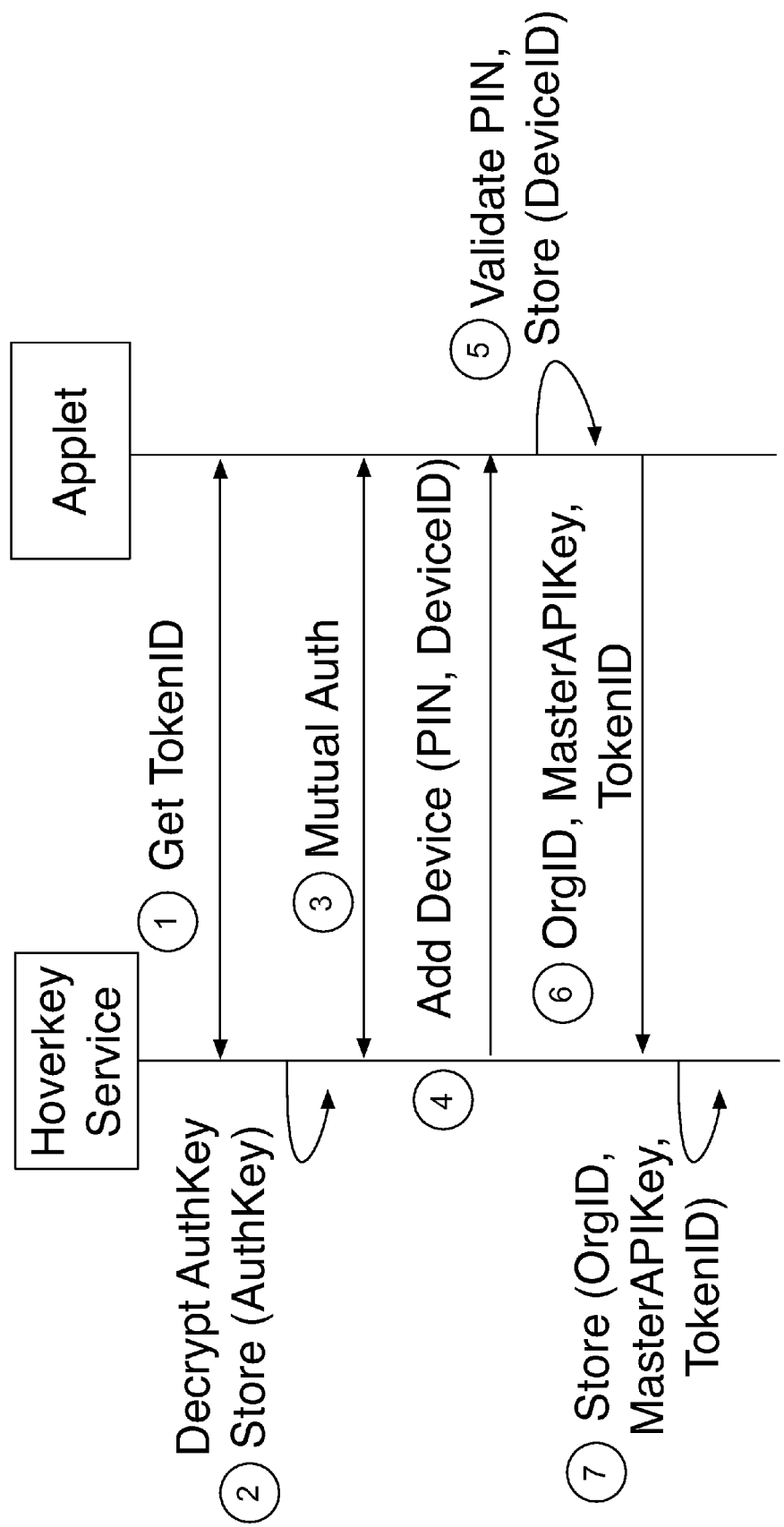
FIG. 4 shows the method of adding a new device to an activated card.
Figure 5A:
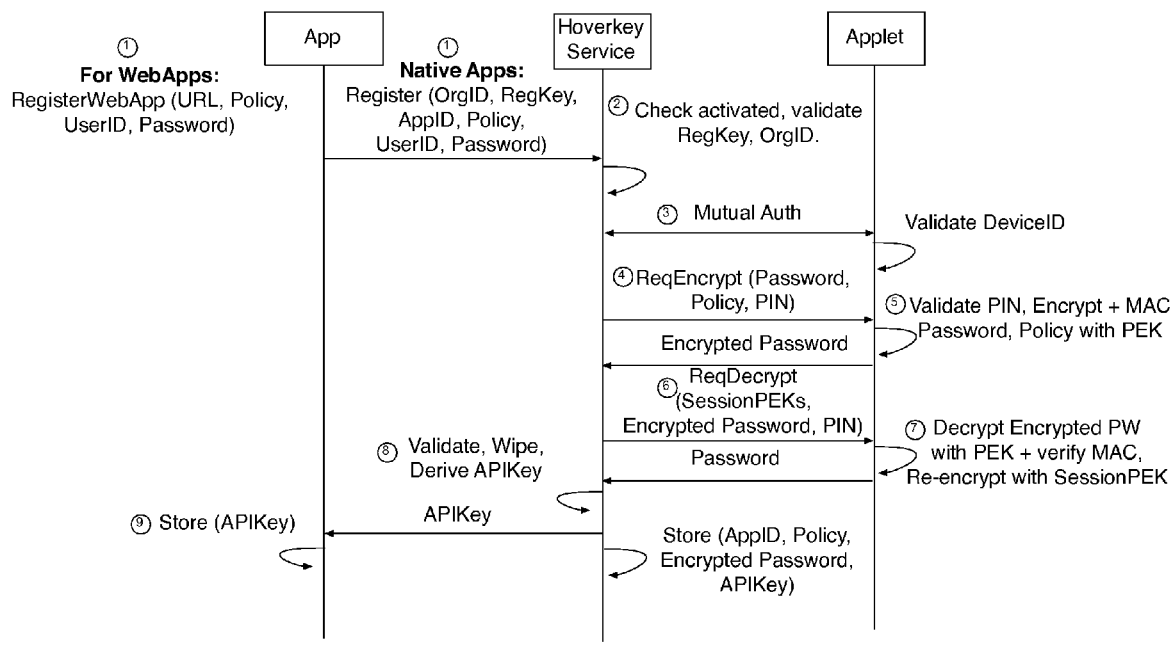
FIG. 5*a* shows the registration protocol for a private app web app.
Figure 5B:
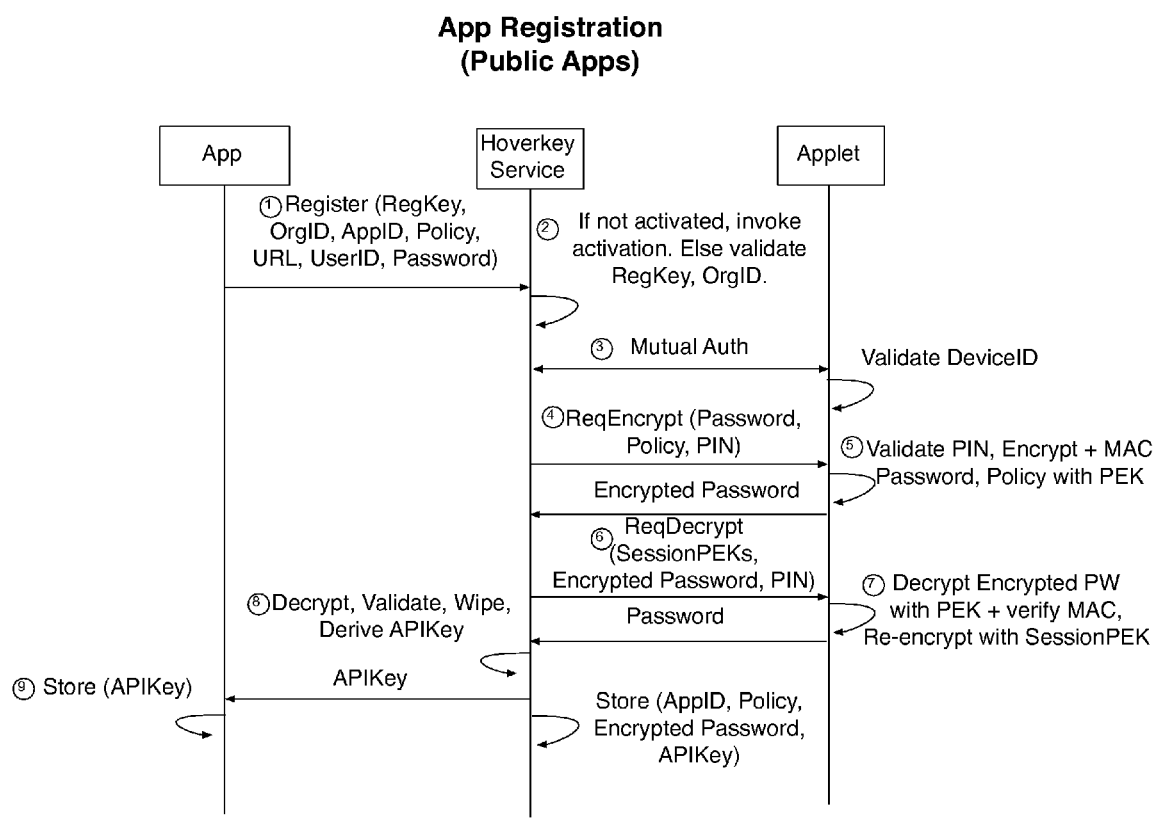
FIG. 5*b* shows the registration protocol for a public app.
Figure 6:
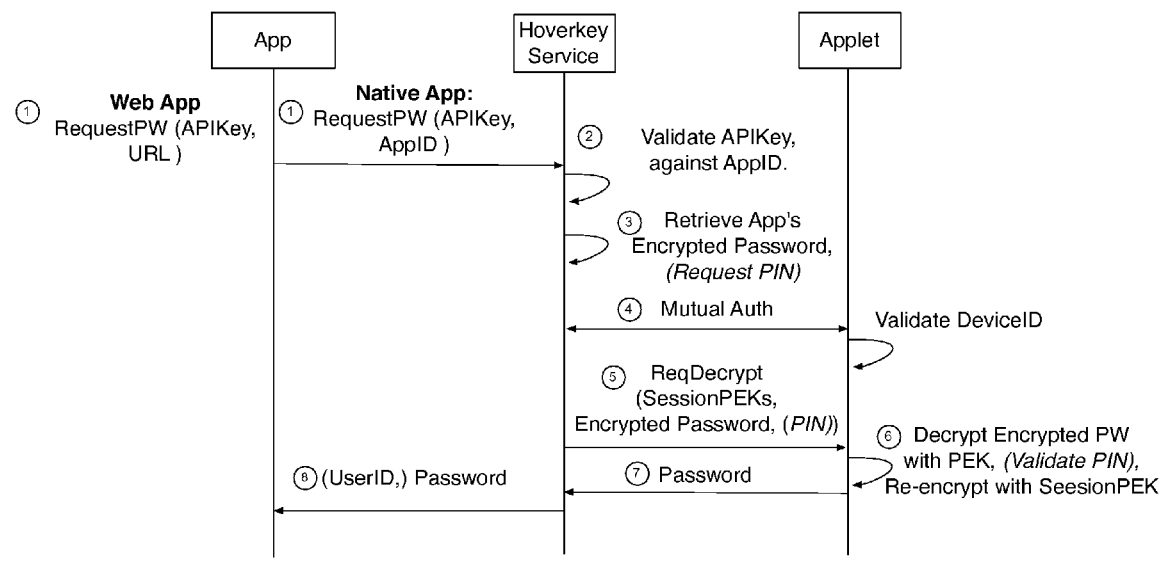
FIG. 6 shows the password access protocol.
Figure 7:
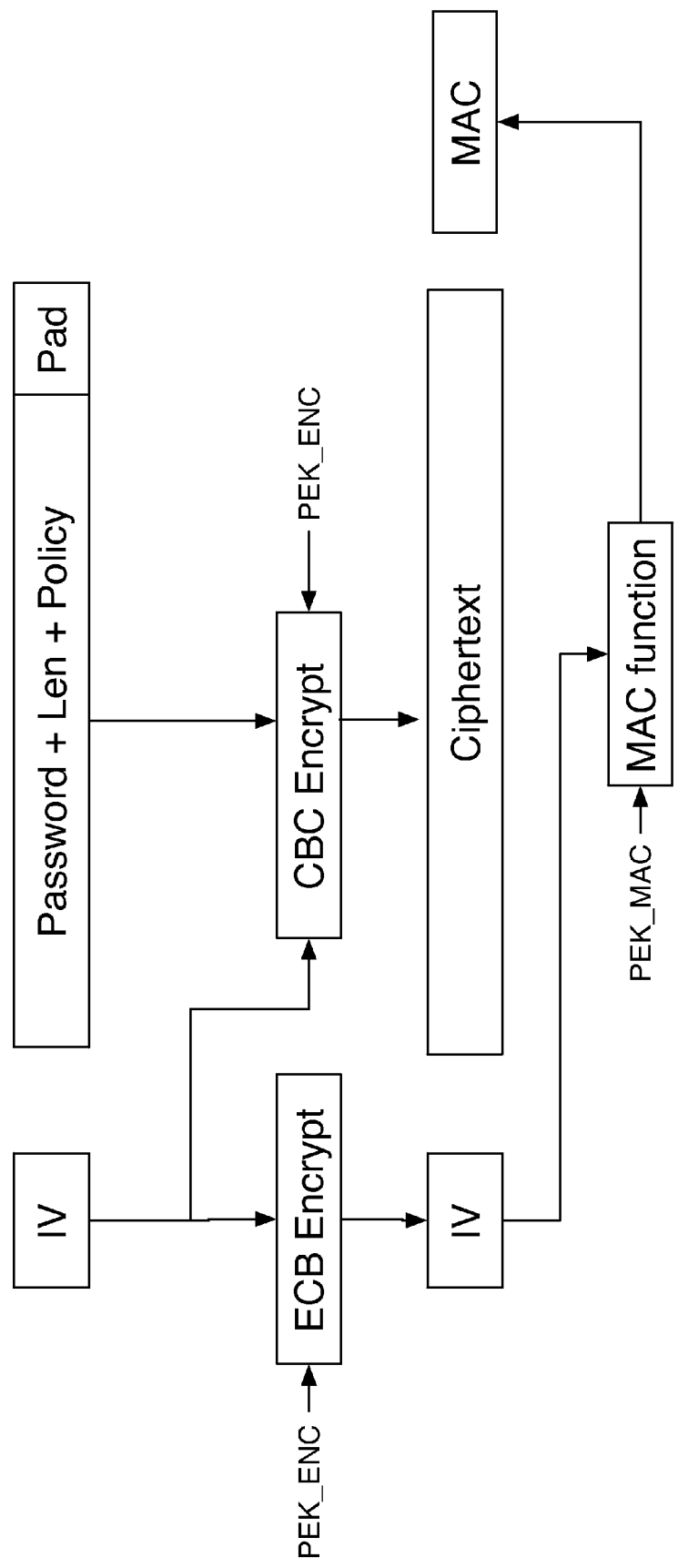
FIG. 7 shows the password encryption process.
Figure 8:
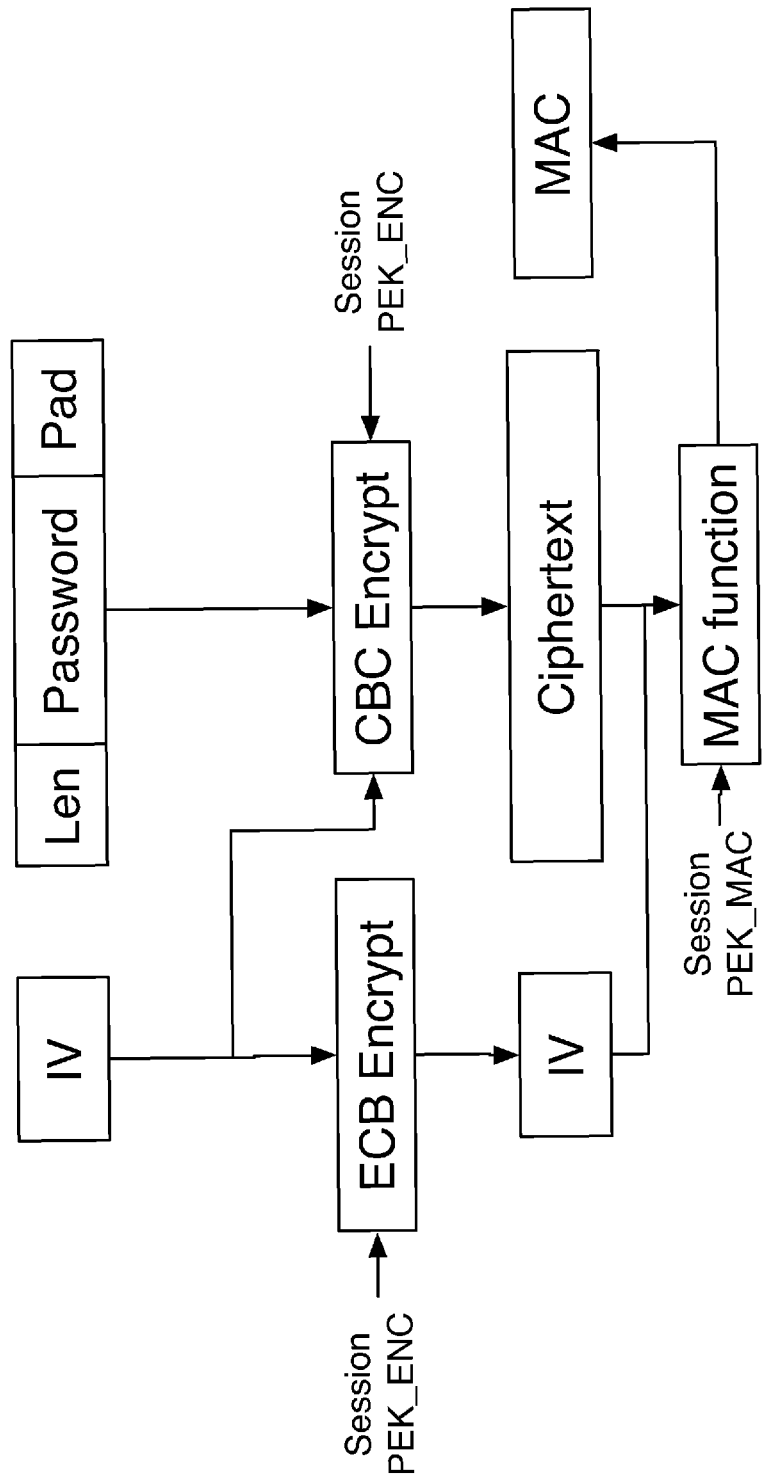
FIG. 8 shows password retrieval encryption.
Figure 9:
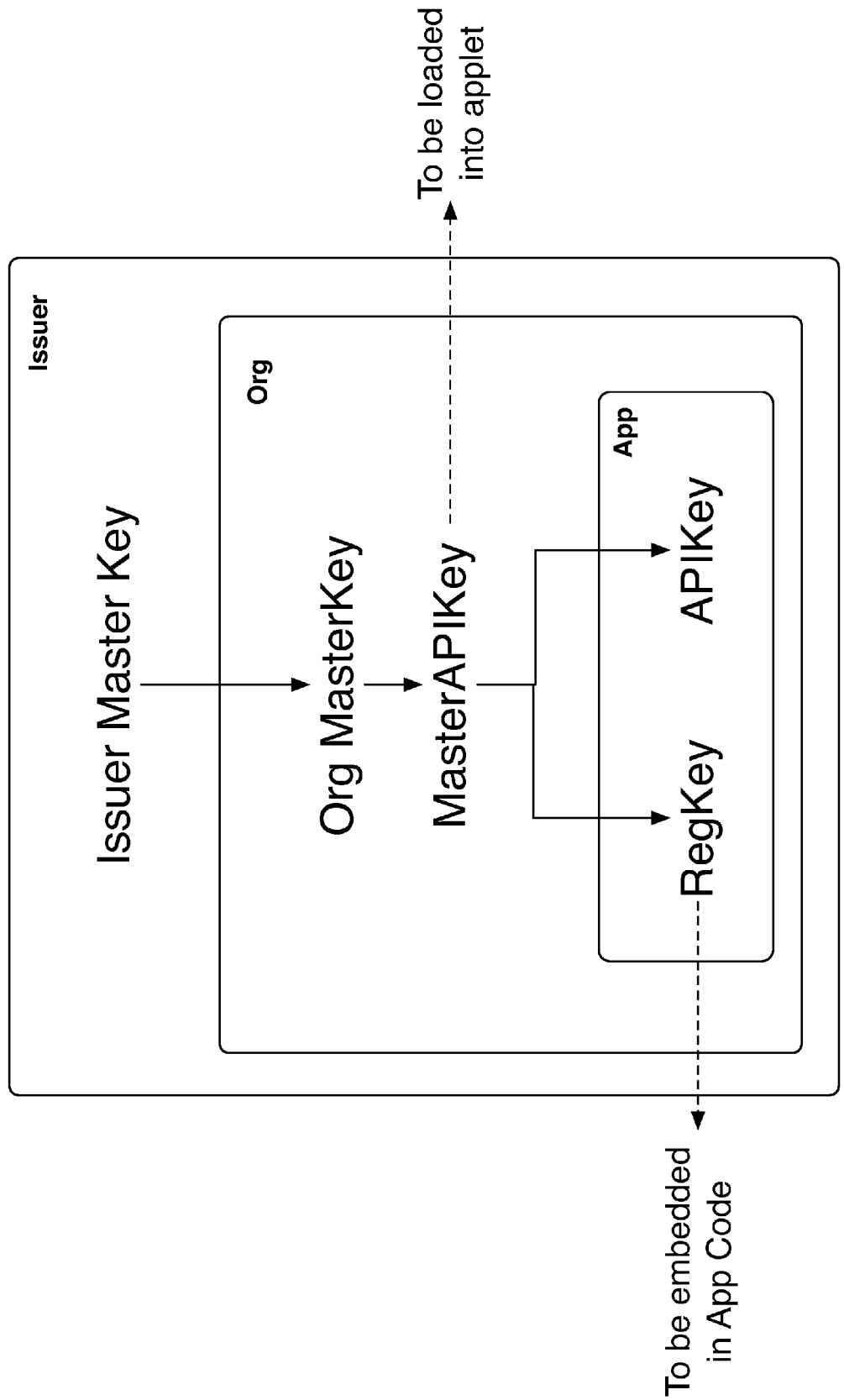
FIG. 9 shows the key hierarchy.

The invention may be carried into practice in a number of ways and one specific embodiment will now be described, by way of example, with reference to the accompanying drawings, in which:

FIG. 1 shows the Hoverkey L1 high level architecture;

FIG. 2 shows the organization of the Java card and the applets FIG. 3 shows the activation protocol;

FIG. 4 shows the method of adding a new device to an activated card;

FIG. 5a shows the registration protocol for a private app web app;

FIG. 5b shows the registration protocol for a public app;

FIG. 6 shows the password access protocol;

FIG. 7 shows the password encryption process;

FIG. 8 shows password retrieval encryption;

FIG. 9 shows the key hierarchy; and

Figure 10:
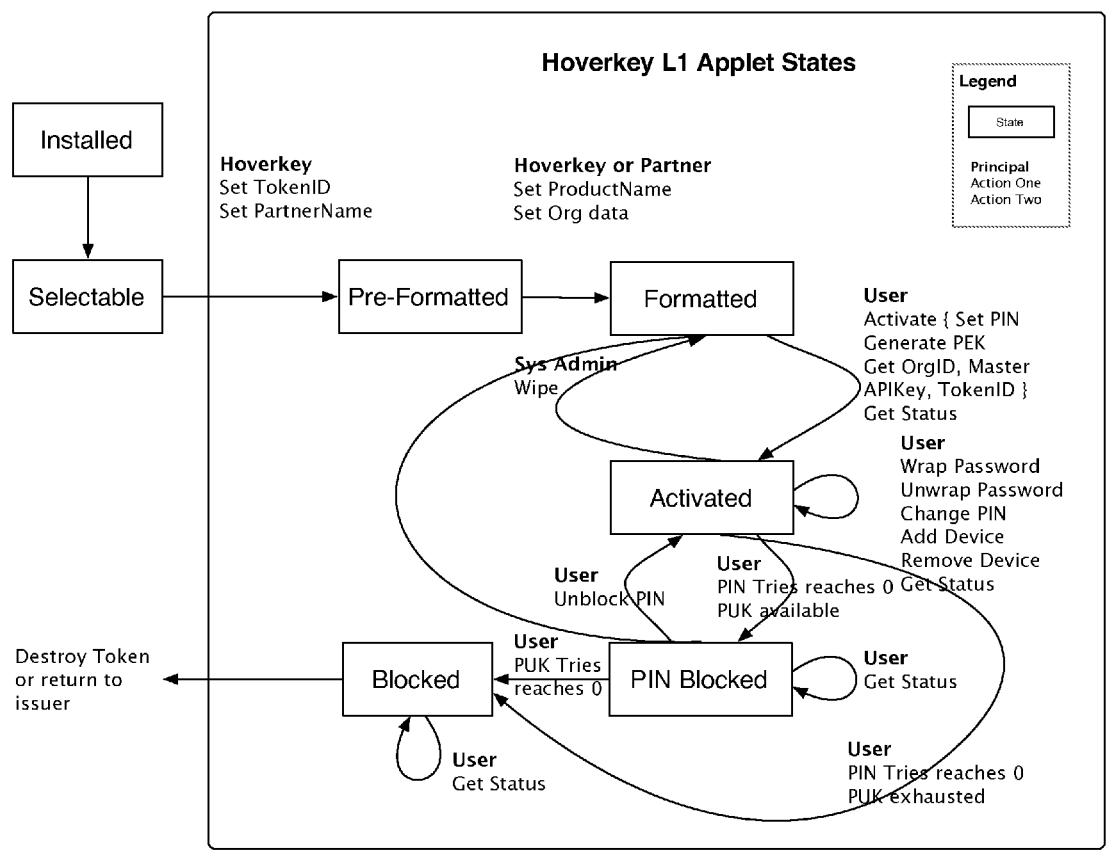
FIG. 10 shows the applet states, and their sequencing.

FIG. 10 shows the applet states, and their sequencing.

3.1 Deployment Model

At a high level, the preferred Hoverkey deployment model is summarised below:

Each User has one or more NFC-enabled mobile device, which may be provided by company or owned by User.

Each User is issued with a unique NFC security token.

Each NFC token may be paired with all devices belonging to the same User.

The following steps are taken in deploying a Hoverkey:

Hoverkey purchases blank NFC tokens from resellers

Upon receipt of trial or purchase order, Hoverkey formats NFC tokens for the Customer or a partner issuer Upon receipt of the NFC token, the User invokes the activation function The User then configure their Hoverkey-enabled apps with their credentials 3.2 Architecture The high level architecture of Hoverkey L1 is illustrated in FIG. 1. Each Developer App (App 1, App 2 and App 3 in the diagram) are embedded with the Hoverkey L1 Component, which allows it to communicate with the Hoverkey Service via an inter-process communication (IPC) protocol.

On each mobile device, there is a single instance of Hoverkey Service which accepts requests from an App and when a password is required. Hoverkey Service retrieves the password on behalf of the App through a series of exchanges with the Java Card applet via the NFC interface.

The advantages of using a service include:

Removes the need share authentication keys (for Applet access) between Apps

No need for Apps to require NFC permissions

Centralised, mediated access to Applet which makes it possible to prevent concurrent access.

On the Android platform, possible IPC mechanisms include the Intent method for simple, coarse grained integration, or the Remote Service method using Android Interface Definition Language (AIDL) for fine-grained, lower-level integration. Hoverkey-protected passwords are encrypted by the card Applet at registration and stored on the mobile device within the Hoverkey App. When access is required, the registered App requests the password via the Hoverkey App, which in turns requests the password be decrypted by the Applet.

3.3 Main Security Design Features

Activation and Pairing: A Hoverkey token can only be used with a device with which it has been paired (at activation). Each mobile device many only be paired with one token. Each token may be paired with up to four devices.

Registration: To defend against malicious apps, third-party apps may only use Hoverkey services after a secure on-device registration process. Subsequent password access requires proof of previous registration.

Two-Factor: Each password may additionally protected with a user chosen PIN to provide a form of two-factor authentication.

Cryptographic security: Hoverkey uses industry-standard cryptographic algorithms and modes for protection of user passwords, supported by best practices in secure key management.

Token Security: Hoverkey token are security-managed throughout their lifecycle to ensure the risks are minimized at all stages.

3.4 Using Hoverkey L1

To use Hoverkey L1, the following steps are followed:

1. New Customer organization orders Hoverkey L1 Cards for their mobile users
2. Hoverkey (or Partner) generates an OrgID for the customer.
   a) Optionally, a RegKey is generated for the customer if they intend to develop their own private Apps, which is delivered the Customer or Developer for embedding into their Apps.
3. Hoverkey formats the required number of cards with OrgID, MasterAPIKey, Admin Key, User Authentication Key and PUKs, and send them to Customer or Developer.
4. Customer development team embeds Hoverkey Component into their own App(s) and configure them with their OrgID and RegKey during development
5. User installs Customer or Developer App(s) and Hoverkey App (from Google Play Store)
6. User receives (formatted) token from Sys Admin and activation email (containing an activation URL)
7. User activates token from within Hoverkey App and sets a PIN
   a) The Hoverkey App downloads a configuration profile file
   b) User is reminded to delete activation email when activation completes
8. Third-party Apps register themselves with Hoverkey App (typically with a user name and password—once for each Customer or Developer App)
9. User starts to use Hoverkey-enabled mobile Apps
10. User may pair additional devices to the token up to four devices.
    a) If a Hoverkey server is used, App data may be synchronized from the server
    b) All Hoverkey-enabled Apps must be re-registered on the new device (as per Step 8).

4. System Components 4.1 Mobile Device

Hoverkey L1 is preferably supported on NFC-enabled Android smartphones, although other platforms are of course equally possible.

4.2 Hoverkey L1 App

The following subsections summaries the functions provided by the Hoverkey L1 App.Token activation
  a) Pairing of NFC token with mobile device
  b) PIN settingToken management
  c) PIN changing
  d) PIN unblocking
  e) Revoking a token
2. App registration—setting user name and password
3. App management
  a) Changing password
  b) De-register an App

4.3 Third-Party Mobile Apps

Embed Hoverkey L1 Component according to implementation guidelines

4.4 NFC Token

FIG. 2 shows the organization of the Java cord and the applets.

The NFC token is a contactless token which supports Java Card and GlobalPlatform specifications. The token preferably has a high level of security approval under the Common Criteria and/or FIPS schemes. The initial product is implemented in the ISO 7810 (credit card) form factor.

The token is designed to support multiple Java Card applets. The Hoverkey system requires one applet to be installed, leaving space on the card for third-party applets.

4.4.1 Hoverkey L1 Applet

The applet implements:
The activation process (also known as "personalization" in common smart card terminology) which includes:
Device/token pairing
Password Encryption Key (PEK) generation
Initial User PIN setting
Password encryption/decryption functions
The cryptographic mutual authentication protocol
The Hoverkey Applet stores and manages the following data objects:

| Name/Label | Description |
|---|---|
| TokenID | A unique identifier for each applet installation |
| DeviceIDs | A list of (up to 4) DeviceIDs associated with this card-the ID should support ASCII text e.g. "GalaxyS3-894579", "DavesTablet-9792234" (so that when the IDs are listed, user can tell which ID corresponds to which device). |
| Password Encryption Key (PEK) | Derived from random values, the keys for encrypting and decrypting User's App passwords, as well as their integrity protection and verification |
| User PIN | The User's PIN used for accessing passwords. It is always set during activation, but each App may decide whether if a PIN is required. The PIN has an associated PIN Tries Remaining counter. |
| User PUKs | The User's PIN Unblock Keys. There is also a single Unlock Tries Remaining counter. |
| Logs | Activity logs for recent auditable events |
| OrgID | A unique identifier for Customer or Developer organization |
| MasterAPIKey | A unique key associated with the OrgID for authentication of private third-party Apps |

4.4.2 Token Lifecycle

The following outlines the lifecycle of an NFC token:
1. Reseller supplies cards to Hoverkey
2. Card formatting
   a) Low-volume deployments: Hoverkey formats cards and supplies to Customer or Developer.
   b) High-volume deployments: Hoverkey provides to a trusted third party card printer:
      Card overlay graphics
      OrgID, MasterAPIKey and AdminKey
      Set of Authentication keys and PUKs
3. User activates card
4. Activated token is:
   a) Revoked and replaced when lost or stolen
   b) Returned and replaced if becomes defective
   c) Returned when User leaves Customer organization
   d) Updated or replaced when a new applet or a new version of the existing applet are available for the User

5. High Level Security Design

5.1 Overview

The Hoverkey L1 App may be downloaded by the User from the Google Play Store and therefore does not have any Customer specific information at installation.

NFC tokens are formatted by Hoverkey which includes loading of Customer data. Upon activation, this data is transferred across to the Hoverkey L1 App to allow Developer Apps to be registered.

Developer Apps need to be registered with the Hoverkey Service (part of the Hoverkey L1 App) prior to becoming NFC-enabled. Registration involves securing the user's password with his (activated) NFC token.

5.2 Password Encryption

The core function of Hoverkey L1 is to provide secure password storage and retrieval. The password is encrypted and integrity protected alongside its metadata. When the password is required, the PEK stored in the NFC token is used to verify decrypt the protected passwords.

5.3 Secure Messaging over NFC

The Global Platform (GP) specification supports secure exchange of APDU messages between the card and the terminal. GP supports three levels of messaging security:

1. Entity authentication only
2. (1) above plus integrity protection
3. (2) above plus confidentiality protection.

Hoverkey L1 supports at secure level 3 messaging using the GP Secure Channel Protocol version 2 (SCP02).

5.4 PIN

In order to support an enhanced level of security, Hoverkey L1 supports the additional use of a PIN which is shared by all third-party Apps (as it is a PIN validated within token applet).

The user is required to set up a PIN at activation, but each third-party App may have their own policy on where a PIN is required for access.

The Sys Admin can enforce the requirement for a user PIN code (for all Apps) at activation via the configuration process.

6. Security Protocols and Procedures

6.1 Activation

FIG. 3 shows the activation protocol
Pre-conditions
AuthKey (plain or obfuscated) obtained from activation URL
Configuration data downloaded to Hoverkey Service via activation URL including:PIN requirementpolicies
Co-branding data
Report configuration
Applet is formatted with OrgID and MasterAPIKey and has not been activated Goals
Establish a shared authentication (pairing) key between Applet and Hoverkey Service Generate and store Password Encryption Key (PEK) on token Initialize User PIN Transfer OrgID and MasterAPIKey to Hoverkey Service (for validation of Developer Apps)

Steps (referring to the corresponding numbers set out in FIG. 3).
1. Hoverkey Service queries token for TokenID
2. The AuthKey may be supplied in plaintext, or, for enhanced security, obfuscated with the TokenID.
   a) If obfuscated, Hoverkey Service de-obfuscates (decrypts) AuthKey with TokenID (as shown in FIG. 3)
   b) If in plaintext, Step 1 is omitted and Step 2 will only need to store the (plaintext) AuthKey
3. Service and Applet perform mutual authentication
4. Service sends activation request, supplying a random number, PIN and DeviceID
5. Applet stores PIN and DeviceID, and derives PEK from Random
6. Applet returns TokenID, OrgID and MasterAPIKey. These are stored by Hoverkey Service, along with RegKey after deriving from MasterAPIKey.
7. Service returns OK
8. Applet updates its status to Activated
9. Upon activation success, if the user has no more devices to pair with his token, he should delete the activation email (and any copies) from his mail account.

6.2 Adding a New Device

FIG. 4 shows the method of adding a new device to an activated token.

Pre-conditions

Applet has already been activated (by another device) Goal

Transfer OrgID and APIKey to Hoverkey Service

Steps (referring to the corresponding numbers set out in FIG. 4)
1. Hoverkey Service retrieves AuthKey from link provided by activation email
2. Service mutually authenticates with (already activated) Applet
3. Service supplies a PIN to authenticate to Applet, along with its own DeviceID to be added
4. Applet validates PIN, stores DeviceID
5. Applet returns OrgID, MasterAPIKey and TokenID
6. Service stores OrgID and APIKey, along with RegKey after deriving from MasterAPIKey.
7. Upon activation success, if the user has no more devices to add to (pair with) his token, he should delete the activation email (and any copies) from his mail account.

6.3 App Registration

The purpose of registration is for the third-party app to authenticate itself to the Hoverkey App, and at the same time to provide Hoverkey App with the user credentials for their secure storage.

Upon successful registration, Hoverkey issues the third-party app with its unique random APIKey for its subsequent Hoverkey API access (i.e. an APIKey even if compromised will be invalid on a different device).

There are two methods for app registration:
1. Asymmetric key method, primarily for public apps, i.e. those available from the App stores.
2. Symmetric key method, primarily for private apps, i.e. those developed in-house and distributed by non-public means0

Asymmetric Key Method

A public app developer wishing to integrate Hoverkey into their app must obtain a Registration Key (RegKey) in the form a certificate, which is embedded into the app prior to its public release. The certificate is issued by Hoverkey and signed with the Hoverkey private key. The corresponding public key is embedded in the Hoverkey App for verification of the app certificate. The idea is that the certificate attests to various attributes of the app (which need to be independently obtainable from the OS), thereby making it difficult for a malicious app to masquerade as genuine.

Attributes to be certified include (for Android app):
Its unique AppID (Package Name on Android whose uniqueness is guaranteed if downloaded from Play Store)

Symmetric Key Method

A private app, i.e. one not deployed through the public app store will employ a different registration scheme. Since the app developer may want to deploy their apps privately without Hoverkey involvement, we employ an alternative method which allows the developer to generate their own RegKey (based on symmetric keys).

FIG. 5 shows the registration protocol. FIG. 5a illustrates registration for a private app web app, and FIG. 5b illustrates registration for a public app. The same reference numbers apply to each.

Precondition

NFC Token has been successfully activated (if not activation will be invoked at Step 2)

Goals

Set up Hoverkey Service for use with this App

Create NFC-token-protected password with for use with Hoverkey Service

Steps (referring to the numbers set out in FIGS. 5a and 5b)
1. App registers itself with OrgID (private app only), APIKey, AppID, Policy and the User's password. In the case of a public app, the RegKey will be a digitally signed certificate. For a private app, the RegKey will be a pseudorandom byte string. Currently supported policies include:
   a) Whether PIN required for this App
2. Hoverkey Service checks whether it has been activated. If activated, it validates the RegKey supplied by the app. For a public app, the RegKey is validated by the Hovkery App Reg Public Key. For a private app, the provided OrgID is checked and RegKey validated against that derived from MasterAPIKey.
3. Service performs mutual authentication with Applet. In addition, Applet validates the DeviceID supplied by Service.
4. Service sends request for password to be encrypted, along with policy and PIN for validation.
5. Applet validates PIN and encrypts the password and policy with the PEK
6. In order to validate successful encryption, Service sends a decryption request with the encrypted password, supplying a the Session PEKs (Session PEK_ENC and Session PEK_MAC) and optionally a PIN (as per policy).
7. Applet decrypts and returns the plaintext password, encrypted under the SessionPEK.
8. Service decrypts and verifies the plaintext password returned and returns success to the App.
9. Service stores the AppID. Policy and encrypted password.

6.4 Password Retrieval

FIG. 6 shows the password access protocol.

Precondition

App has registered itself with the Hoverkey Service and set up an encrypted password The Applet is in Activated state Goal
   Retrieves the specified password that has been protected by the NFC token
   Optionally, retrieves user ID (if stored)
Steps (referring to the number set out in FIG. 6)
   1. App sends request password command, supplying APIKey, AppID.
   2. Hoverkey Service validates the request
   3. Service retrieves the App's encrypted password and requests PIN from user if required by Policy.
   4. Service mutually authenticates with Applet. In addition, Applet validates the DeviceID supplied by Service.
   5. Service sends the encrypted password to Applet for decryption, supplying session keys (Session PEK_ENC and Session PEK_MAC), and optionally a PIN (as per policy).
   6. Applet authenticates and decrypts the input, and validates the PIN if required.
   7. Applet returns the plaintext password encrypted under the Session PEK and integrity protected with Session PEK_MAC
   8. The password is decrypted and returned to the App.

6.5 Changing Password for App
   To change the password for an App, Hoverkey services simply replaces the existing encrypted password with a new one, with the following steps:
   1. Mutual authentication, Applet validates DeviceID
   2. Requires PIN
   3. Service sends new password and policy
   4. Applet returns encrypted password 6.6 Changing PIN
   To change the token PIN, the following steps are followed:
   1. Mutual authentication, Applet validates DeviceID
   2. Requires old PIN,
   3. User enters new PIN (twice)
   4. Applet stores new PIN 6.7 Deregister App
   Remove the following information for the App:
   (Hoverkey token not required)
   1. AppID
   2. Any encrypted password(s)
   3. Any saved user name(s)
   4. Policy 6.8 Revoking NFC Token
   If the token is lost, perform once by each associated device:
   (The Hoverkey token not required)
   Wipe authentication key from Hoverkey App
   Wipe all encrypted passwords
   Reset Hoverkey app to pre-activated state
   The Hoverkey App also downloads a list of revoked Token IDs periodically, which allows it to revoke the token if an entry matches the one that it is paired with.

6.9 List Devices
   Can be performed
      by any paired device
         mutual auth, Applet validates DeviceID, or mutual auth with Admin Key
      Or after mutual auth with Admin Key
   No PIN required
   Applet returns list of associated Device IDs 6.10 Revoking a Device
   Usually takes place after List Devices—as Hoverkey App is not expected to remember the device ID list
   Can be performed from any paired device
   Mutual auth, Applet validates DeviceID
   Requires PIN
   Removes DeviceID from Applet 6.11 PIN Blocking
   Within the Applet, the User PIN has an associated PIN Tries Remaining (PTR) value, initialized to a specified number.
   The Applet also has a fixed number (5) Personal Unblocking Keys (PUK) of 8 digits, labelled PUK1, PUK2 etc, which are randomly generated and loaded at formatting. A copy of the PUKs for each token is provided to the Sys Admin The Applet maintains a single Unblocking Tries Remaining (UTR) value, initialized to a specified number.
   Each time the PIN is successfully validated, PTR is reset to its initial value.
   Each time an incorrect PIN is detected, PTR is decremented by one.
   If PTR reaches zero, the User PIN is blocked. The Applet also returns to the Service which PUK the user should use to unblock the PIN, and tries remaining for that PUK.
   In order to unblock and reset the PIN, the user must request his PUK code from SysAdmin as indicated by within PIN blocked UI or by retrieving applet status (see Section 0). If this is the first time the User unblocks the PIN, he will request the PUK1 code; the second time will require PUK2 etc., i.e. each PUK code can only be used once.
   If the User's PUK codes are exhausted, as soon as PTR reaches zero again, the Applet is blocked. The NFC token must be replaced.
   Each time a PUK is entered incorrectly, the UTR is decremented. If UTR reaches zero, the Applet is blocked. The NFC token must be replaced.

6.12 Get Applet Status
   Can be performed from any device
   If not authenticated
      Applet returns TokenID, Applet State
   If authenticated (with Auth Key or Admin Key)
      If in Formatted State: returns TokenID, Applet State, PIN Tries Remaining Counter=Max, current PUK index, current PUK Tries Remaining counter. (this may not be max since applet may have been reset to formatted, which does not reset PUK status, i.e. used PUKs remains used). The current PUK index is the index of the PUK code the use should ask for if the current PIN becomes blocked.
      If in Activated State: returns TokenID, Applet State, PIN Tries Remaining Counter, current PUK index, PUK Tries Remaining counter=Max
      If in PIN Blocked State: returns TokenID, Applet State, PIN Tries Remaining Counter=0, current PUK index, PUK Tries Remaining counter
      If in Blocked State: returns TokenID=0, Applet State 6.13 Admin Functions
   All functions within this section require mutual authentication with Admin Key.
   6.13.1 Reformat Token
      In order to re-format the token (e.g. for issuing to a new user)
      Mutual auth with Admin Key
      Send reformat command to:
         Remove existing User PIN (and reset retry counter)
         Remove existing password protection keys PEK_ENC, PEK_MAC
         Reset applet to FORMATTED state
         (Does not reset PUKs—used PUKs remains used)

6.13.2 PIN Reset
In order for the Sys Admin to reset the PIN,
Mutual auth with Admin Key
Send PIN reset command with the user's new PIN (Does not require PUK)

6.14 Emergency Access

6.14.1 Lost/Defective NFC Token
For emergency online access, the user may simply login manually with his password. If the user does not know/remember his password (due to the use of a complex password, for example), the application's password reset facility may be used to set a new password (and also change the Hoverkey protected password).

6.14.2 Forgotten/Blocked PIN
If an App's policy requires a PIN which the User does not remember, he could:
  Try different PINs until PIN Blocked (if not already) and request a PUK from the Sys Admin to Unblock and reset the PIN,
  Log in manually if he remembers the user ID and password (although he will have to either recall or reset the PIN eventually to continue using Hoverkey L1).

7. Cryptographic Specification

7.1 Key Management
For security purposes, keys used for encrypting and integrity-protecting user passwords for storage (generated by the applet at activation) never leave the applet (nor the physical token). Session keys are also used (generated by the Hoverkey App) for encrypting and integrity-protecting passwords over NFC after decryption. These are wiped immediately after use.

7.2 Password Storage Encryption Process
FIG. 7 shows the password encryption process.
Encrypting password for storage, to be performed by the applet.
  a) Combine policy, length of password and password itself received from device, apply padding to align with encryption block length
  2. Generate a random Initialization Vector (IV) of encryption cipher block length
  3. Encrypt block generated in Step 1 in CBC mode using IV from Step 2, using Key PEK_ENC
  4. Encrypt the IV with PEK_ENC in ECB mode
  5. Calculate a MAC on (output from Step 4+output from Step 3) using a hash based MAC (HMAC) with the key PEK_MAC
  6. (Output from Step 5+output from Step 3+MAC from step 4) is returned to device for storage

7.3 Password Retrieval (Session) Encryption Process
FIG. 8 shows password retrieval encryption.
To be performed by applet, after verification of the MAC, decryption of the encrypted object supplied by device, and validation of the policy field.
  1. The plaintext password is left padded with a two-byte length field, and right padded with random bytes to make the largest allowable block (fits within an R-APDU) whose size is a multiple of the cipher block length
  2. Steps 2-5 as per the Password Storage Encryption Process, except that Session_PEK_ENC and Session_PEK_MAC are used for encryption and integrity protection instead.

7.4 App Registration Key Derivation Hierarchy (Symmetric Key)
FIG. 9 shows the key hierarchy. Keys are derived using the HMAC-Based KDF with as described in NIST Special Publication 800-108, [: L. Chen, *Recommendation for Key Derivation Using Pseudorandom Functions* (Revised), NIST SP 800-108, October 2009, available from http://csrc.nist.gov/publications/nistpubs/800-108/sp800-108.pdf. This document is incorporated by reference.

Issuer Keys
  IssuerMasterKey=Random bytes generated by secure RNG
Org Keys
  OrgID=Assigned unique OrgID
  AppID=(globally) unique app identifier

8. Hoverkey Applet Status
FIG. 10 illustrates the applet statuses, and their sequencing.

| State | Description |
| --- | --- |
| Installed | Applet is installed but not yet selectable |
| Selectable | Applet is now selectable and now ready to be personalized. |
| Formatted | Personalization step 1: Hoverkey (or a trusted third-party) has generated and loaded OrgID, APIKey, Auth Key, Admin Key and PUKs. Admin may reset activated cards to this state. All data objects are reset except for any PUKs that have been used. |
| Activated | Personalization step 2: Token delivered to User who has also received his personalized activation email. He has followed the instructions to activate the token and set the PIN. The Applet is now ready to be used operationally. Additional devices may be added at this point. |
| PIN Blocked | If the User's PIN tries remaining counter reaches zero (with at least one unused PUK remaining), the Applet enters this state and will not perform the core functions until it's unblocked with a PUK |
| Blocked | If PUK tries counter reaches zero or PIN tries counter reaches zero with no more PUK remaining, the Applet becomes locked. The token must be revoked, then it may be destroyed or sent back to Hoverkey |

9. Glossary

| Term | Definition |
| --- | --- |
| Applet | Software program running on a smart card supporting Global Platform and card (e.g. Java Card) specifications |
| Application Protocol Data Unit (APDU) | Basic communication messages between a smart card and the terminal (reader) |

| Term | Definition |
| --- | --- |
| App Registration | Validation of a third party app by Hoverkey at first use and issuance of API key for subsequent access |
| Customers | The person or organization responsible for day-to-day management of Hoverkey tokens. In particular, they are responsible for sending out activation emails and, when a user requires PIN unblocking, authenticating the user and issuing PUK codes.<br>When selling directly to End Users, Hoverkey will in effect play the role of the Customer. |
| Developers | Developers of mobile applications, especially those who embed Hoverkey functions into their apps |
| DeviceID | A unique identifier for a mobile device (or one that is highly likely to be unique) |
| Developer Apps | Developers may enhance the security of their existing mobile applications by creating a Developer App, using the Hoverkey iOS and Android or other types of code libraries. |
| End User (or User) | A members of a Customer organization who uses Hoverkey-enabled applications |
| Emergency Access | An optional service which allows access to Hoverkey-protected services without a functioning NFC token using a pre-specified back-up authentication method. |
| Global Platform | An organization responsible for specifying standards for smart card application (i.e. applet) management |
| Hoverkey L1 App | An application installed and run on the User's mobile device providing Hoverkey Service and management functions |
| Hoverkey Component | Software component provided by Hoverkey for integration into third-party Apps |
| Issuer Partner | An organization with an established relationship with Hoverkey to issue Hoverkey tokens to their Customer |
| Personal Identification Number (PIN) | A sequence of digits which is kept secret by the user for authentication to the NFC Token |
| System Administrator (Sys Admin) | Typically the person in the Customer organization who is responsible for implementing IT security policies and will have influence over any security product that may be selected by the organization. They have a technical skillset. They may also take the role of User Administrator (see below) in small deployments. |
| Token Activation | The process by which an End User sets up the first use of his NFC token |
| Token Formatting | The process by which blank smart cards are prepared for the Customer |
| User Admins | This is the person in the Customer organization who is responsible for the operating the IT security systems. |

HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
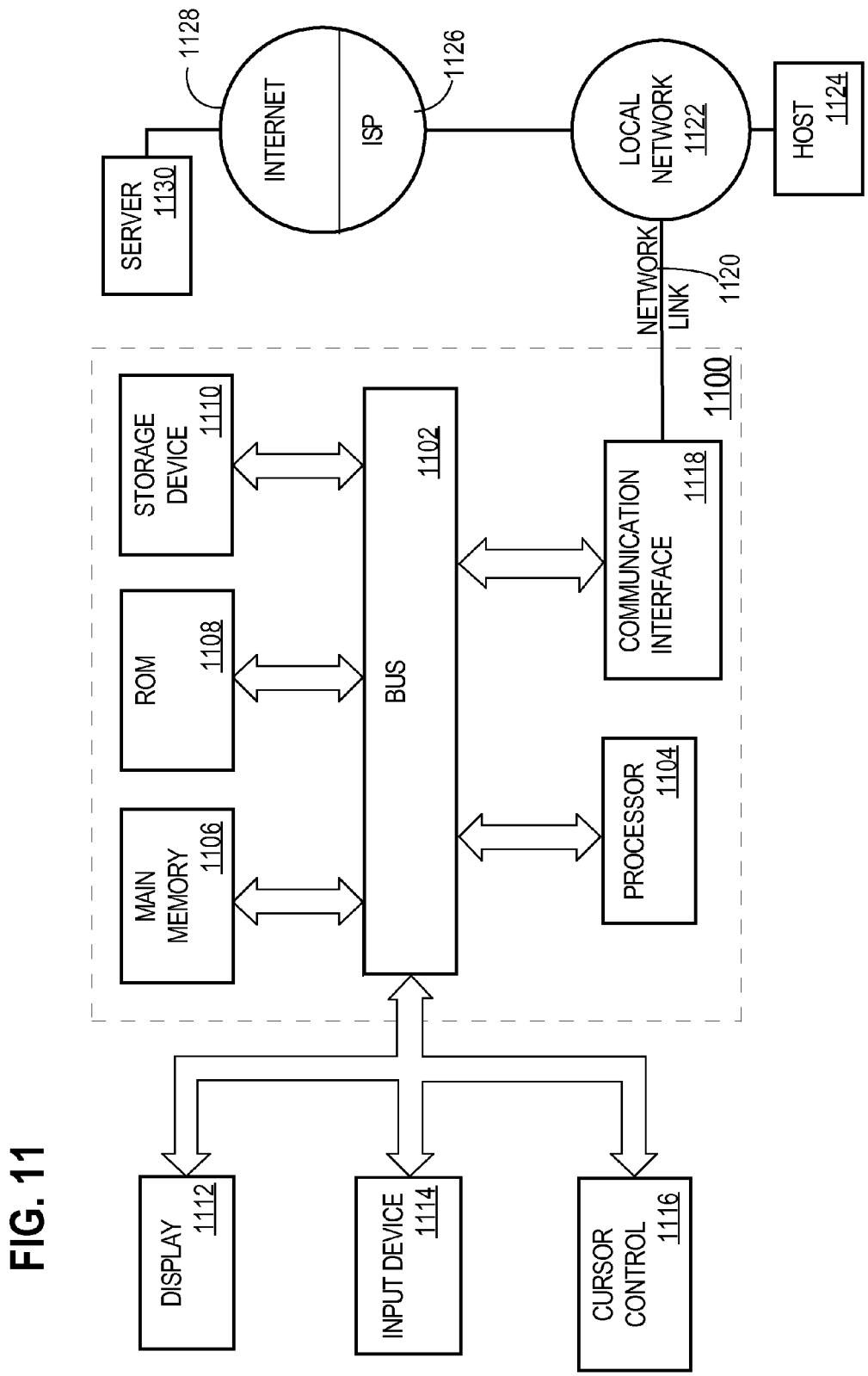
FIG. 11 is a block diagram that illustrates a computer system upon which an embodiment of the invention may be implemented.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

We claim:

1. A method of authenticating a computer resource comprising an application on a mobile device comprising:
   storing an encrypted resource authorization on the mobile device;
   receiving, from the mobile device, a request for a password wherein the request comprises one or more application credentials for that particular application; validating the application credentials; retrieving the encrypted resource authorization for the application;
   transmitting the encrypted authorization to a separate portable security token;
   on the portable security token, using user decryption credentials stored on the portable security token, decrypting the encrypted authorization and generating at least partially therefrom an unlock response;
   wherein the unlock response comprises a decrypted password for the application;
   securely transmitting the unlock response to the mobile device; and
   unlocking the computer resource if the received unlock response is valid.

2. A method as claimed in claim 1 in which the unlock response comprises a plain authorization, obtained by decrypting the encrypted authorization.

3. A method as claimed in claim 1 in which the unlock response comprises a function of a plain authorization, obtained by decrypting the encrypted authorization, and additional information.

4. A method as claimed in claim 1 in which the authorization comprises a password or a PIN.

5. A method as claimed in claim 1 in which the authorization comprises a cryptographic key.

6. A method as claimed in claim 1 in which the unlock response is transmitted to the mobile device under the protection of an encryption key, such as a session key.

7. A method as claimed in claim 1 in which the token stores user credentials, the decryption on the token being based on the user credentials.

8. A method as claimed in claim 7 in which the user credentials are generated by the token and never leave the token.

9. A method as claimed in claim 7, in which the encrypted authorization stored on the mobile device can be decrypted solely with the corresponding user credentials stored on the token.

10. A method as claimed in claim 1 providing two-factor authentication by requiring a user in addition to authenticate separately on the mobile device.

11. A method as claimed in claim 8, in which a user secret is passed from the device to the token and is validated by the token before the decryption operation takes place.

12. A method as claimed in claim 1 which the authentication on the mobile device is validated on the token before the unlock response is sent.

13. A method as claimed in claim 1 including running a service on the mobile device which controls device cryptographic functions and access to the resource.

14. A method as claimed in claim 1 including running an applet on the token which provides token cryptographic functions.

15. A method as claimed in claim 1 including verifying integrity on the token by a message authentication code received from the device.

16. A method as claimed in claim 1 in which the integrity of the encrypted authorization is verified on the token prior to decryption.

17. A method as claimed in claim 1 in which the device and the token perform cryptographic mutual authentication before transmission of the encrypted authorization.

18. A method as claimed in claim 17 in which the mutual authentication is by symmetric key cryptography.

19. A method as claimed in claim 1 in which the encryption and decryption are by symmetric key cryptography.

20. A method as claimed in claim 1 in which the resource comprises an application running or stored on the mobile device.

21. A method as claimed in claim 1 in which the resource comprises data stored on the mobile device.

22. A system of authenticating access to a computer resource comprising an application on a mobile device with a portable security token, comprising:
  a mobile device including a computer resource to be protected, a device communications system, and device storage for storing an encrypted resource authorization;
  a portable security token including token storage for storing private user credentials, a token communications system, and a token processor providing cryptographic functions;
  and wherein in use the portable security token receives a request for a password wherein the request comprises one or more application credentials for that particular application; validates the application credentials; retrieves the encrypted resource authorization for the application; and the encrypted authorization stored on the mobile device is transmitted by the device communications system to the portable security token, is decrypted on the portable security token using the private user credentials, the portable security token generating at least partially therefrom an unlock response, the unlock response being securely transmitted by the token communications system to the mobile device, wherein the unlock response comprises a decrypted password for the application;
  and
  the mobile device being arranged to unlock the resource if the received unlock response is valid.

23. A system as claimed in claim 22 in which the authorization comprises an application password or a PIN.

24. A system as claimed in claim 22 in which the authorization comprises a cryptographic key.

25. A system as claimed in claim 22 in which the unlock response is transmitted by the device communications system to the mobile device under the protection of an encryption key such as a session key.

26. A system as claimed in claim 22 which the token is a card.

27. A system as claimed in claim 22 in which the device communications system and the token communications system communicate over the air.

28. A system as claimed in claim 27 in which communication is by NFC.

29. A system as claimed in claim 22 in which the device communications system and the token communications system communicate when the token is placed in close proximity to or is touched to the device.

30. A system as claimed in claim 22 in which the mobile device requires a user in addition to authenticate separately on the mobile device, thereby providing two-factor authentication.

31. A system as claimed in claim 30 in which the separate authentication on the mobile device is validated on the token before the unlock response is sent.

32. A system as claimed in claim 31 in which the device communications system sends a user secret to the token which is validated by the token before the decryption operation takes place.

33. A system as claimed in claim 22 in which the device communications system sends a message authentication code (MAC) to the token, which is validated by the token before the decryption operation takes place.

34. A system as claimed in claim 22 in which the integrity of the encrypted authorization is verified on the token prior to decryption.

35. A system as claimed in claim 22 in which the device and the token are arranged to perform cryptographic mutual authentication before transmission of the encrypted authorization.

36. The system of claim 22 in which the unlock response comprises a function of a plain authorization, obtained by decrypting the encrypted authorization, and additional information.

37. A hardware token for authenticating a computer resource comprising an application on a mobile device, the token comprising:
  token storage for the storage of a plurality of private user credentials;
  a token communications system for communicating with a mobile device;
  a token processor providing cryptographic functions; and wherein, in use:

the token stores an encrypted resource authorization on the mobile device; receives from the mobile device, a request for a password wherein the request comprises one or more application credentials for that particular application; validates the application credentials; retrieves the encrypted resource authorization for the application;

on receipt by the token communications system of the encrypted resource authorization from the mobile device, the token processor verifies the integrity and decrypts the encrypted resource authorization and generates at least partially therefrom an unlock response, wherein the unlock response comprises a decrypted password for the application, and wherein the token communications system securely transmits the unlock response for use by the mobile device for use to unlock the computer resource if the received unlock response is valid.

38. The hardware token of claim 37 in which the unlock response comprises a function of a plain authorization, obtained by decrypting the encrypted authorization, and additional information.

\* \* \* \* \*